US006642326B1

(12) United States Patent
Meyer et al.

(10) Patent No.: US 6,642,326 B1
(45) Date of Patent: Nov. 4, 2003

(54) USE OF SILANES TO ENHANCE ACTIVITY IN SINGLE-SITE POLYMERIZATIONS

(75) Inventors: Karen E. Meyer, Cincinnati, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 34 days.

(21) Appl. No.: 10/137,852

(22) Filed: May 3, 2002

(51) Int. Cl.$^7$ .................................................. C08F 4/44
(52) U.S. Cl. ....................... 526/134; 526/128; 526/160; 526/170; 526/943; 526/348.2; 526/348.5; 526/348.6
(58) Field of Search ................ 526/134, 128, 526/100, 170, 943, 348

(56) References Cited

U.S. PATENT DOCUMENTS

| 4,752,597 | A | | 6/1988 | Turner .......................... 502/104 |
| 4,791,180 | A | | 12/1988 | Turner .......................... 526/160 |
| 5,153,157 | A | | 10/1992 | Hlatky et al. ................ 502/117 |
| 5,198,401 | A | | 3/1993 | Turner et al. ................ 502/155 |
| 5,241,025 | A | | 8/1993 | Hlatky et al. ................ 526/129 |
| 5,414,180 | A | | 5/1995 | Geerts et al. ................ 585/525 |
| 5,539,124 | A | | 7/1996 | Etherton et al. ............ 548/402 |
| 5,554,775 | A | | 9/1996 | Krishnamurti et al. ......... 556/7 |
| 5,578,690 | A | * | 11/1996 | Marks et al. ................ 526/347 |
| 5,637,660 | A | | 6/1997 | Nagy et al. .................. 526/160 |
| 5,648,440 | A | | 7/1997 | Sugano et al. ............... 526/132 |
| 5,902,866 | A | | 5/1999 | Nagy et al. .................. 526/133 |
| 6,075,103 | A | | 6/2000 | Marks et al. ................ 526/127 |
| 6,077,919 | A | | 6/2000 | Marks et al. .................. 526/82 |
| 6,211,311 | B1 | | 4/2001 | Wang et al. ................. 526/131 |
| 6,232,260 | B1 | | 5/2001 | Nagy et al. .................. 502/155 |
| 6,281,155 | B1 | | 8/2001 | Meyer et al. ................ 502/154 |
| 6,310,150 | B1 | | 10/2001 | Meyer et al. ................ 526/133 |
| 6,355,818 | B1 | | 3/2002 | Timmers et al. ............... 556/8 |
| 6,395,846 | B1 | * | 5/2002 | Sato et al. ..................... 526/92 |

FOREIGN PATENT DOCUMENTS

EP 0739910 10/1996

OTHER PUBLICATIONS

Koo, et al., *J. Am. Chem. Soc. 121* (1999), pp. 8791–8802, "Silicon–Modified Ziegler—Natta Polymerization. Catalytic Approaches to Silyl–Capped and Silyl–Linked Polyolefins Using 'SIngle–Site' Cationic Ziegler—Natta Catalysts."

* cited by examiner

*Primary Examiner*—David W. Wu
*Assistant Examiner*—Rip A Lee
(74) *Attorney, Agent, or Firm*—John Tyrell; Jonathan L. Schuchardt

(57) ABSTRACT

A process for the polymerization of olefins is disclosed. A boraaryl catalyst precursor and an activator are used in the presence of a silane modifier. A low level of silane modifier enhances the activity of the catalyst.

16 Claims, No Drawings

USE OF SILANES TO ENHANCE ACTIVITY IN SINGLE-SITE POLYMERIZATIONS

FIELD OF THE INVENTION

This invention relates to a polymerization process for olefins. In particular, the invention relates to a high activity polymerization process with a boraaryl single-site catalyst precursor, an activator and a silane modifier.

BACKGROUND OF THE INVENTION

Interest in single-site (metallocene and non-metallocene) catalysts continues to grow rapidly in the polyolefin industry. These catalysts are more reactive than Ziegler-Natta catalysts and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes commonly include one or more cyclopentadienyl groups, but many other ligands have been used. Thus, a catalyst structure can be fine-tuned to give polymers with desirable properties. A preferred group of polymerization-stable ligands are boraaryl ligands as described in U.S. Pat. Nos. 5,554,775 and 6,355,818.

The incorporation of silanes in polymerizations using cyclopentadienyl metallocene catalysts is described in EP 0739910, *J. Am. Chem. Soc.* 121 (1999) 8791, and in U.S. Pat. Nos. 5,578,690, 6,075,103 and 6,077,919. High levels of silane are used to control the molecular weight. For instance, in the seventeen examples of EP 0739910, the silane is used in amounts of 26,800 to 465,000 ppm Si. At these levels, polymer molecular weight decreases with increasing silane and there is no clear effect on activity.

Despite the importance of olefin polymerizations and the considerable research that has been done on various catalyst systems, there remains a need to improve the activity of the catalyst. This can be important from a cost view since the catalyst is typically one of the more costly ingredients. Similarly, the equipment for catalyst handling can add to the cost. Any improvement in catalyst activity decreases these costs. However, even more important is that the residual metal in the polymer is reduced. High levels of residual metal can have a deleterious effect on polymer properties such as color and aging. It is therefore important to keep the residual metals as low as possible. Any improvement in catalyst activity lowers the residual metals in the polymer.

SUMMARY OF THE INVENTION

This invention is a process for the polymerization of an olefin. An olefin is polymerized with a catalyst precursor in the presence of an activator and a modifier. The modifier is a hydrosilane or a polysiloxyhydrosilane and serves to improve the activity of the catalyst. Low levels of the modifier give a large increase in catalyst activity while still affording high molecular weight polymers. The process of the invention is easy to practice and affords enhanced catalyst activity. Since the catalyst is not removed from the final polymer, an increase in activity results in a polymer with lower residual metals. The process is robust and gives an improvement in activity for copolymers of olefins such as ethylene and propylene as well as the homopolymers.

DETAILED DESCRIPTION OF THE INVENTION

The invention is an olefin polymerization process. Suitable olefins are $C_2$–$C_{20}$ α-olefins, such as ethylene, propylene, 1-butene, 1-hexene, 1-octene and mixtures thereof. Preferred olefins are ethylene, propylene and mixtures thereof with α-olefins such as 1-butene, 1-hexene and 1-octene.

The polymerization is performed with a catalyst precursor comprising a Group 3 to 10 transition metal, M, and at least one anionic boraaryl ligand. Boraaryl ligands are described in U.S. Pat. Nos. 5,554,775 and 6,355,818, the teachings of which are incorporated herein by reference. In addition to the boraaryl ligand, the catalyst precursor may also include a polymerization-stable anionic ligand. Examples include substituted and unsubstituted cyclopentadienyl, fluorenyl and indenyl, or the like, such as those described in U.S. Pat. Nos. 4,791,180 and 4,752,597, the teachings of which are incorporated herein by reference. Other suitable polymerization-stable ligands are heteroatomic ligands such as pyrrolyl, indolyl, indenoindolyl, quinolinoxy, pyridinoxy, and azaborolinyl as described in U.S. Pat. Nos. 5,539,124, 5,637,660, 5,902,866, and 6,232,260, the teachings of which are incorporated herein by reference. The catalyst precursor also usually includes one or more labile ligands such as halides, alkyls, alkaryls, aryls, dialkylaminos, or the like. Particularly preferred are halides, alkyls, and alkaryls (e.g., chloride, methyl, benzyl). Preferred transition metals are Group 4–6 transition metals, and of these, zirconium is especially preferred.

The catalysts include an activator. Suitable activators ionize the catalyst precursor to produce an active olefin polymerization catalyst. Combinations of activators may be used. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis (pentafluorophenyl)-aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The amount of activator needed relative to the amount of catalyst precursor depends on many factors, including the nature of the precursor and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. Optionally, a portion of the activator is premixed with the catalyst and the remainder added directly to the reactor. When a supported catalyst system is used, the activator can be deposited onto the support along with the catalyst precursor.

The catalyst precursor and activator are optionally used with an inorganic solid or organic polymer support. Suitable inorganic supports include silica, alumina, silica-aluminas, magnesia, titania, clays, zeolites, or the like. The inorganic support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. Suitable organic polymer supports include polyethylene, polypropylene and polystyrene. Small particle size polyethylene has been found to be particularly suitable. See, for example, the techniques described in U.S. Pat. Nos. 6,281,155 and 6,310,150, the teachings of which are incorporated herein by reference.

The precursor and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the precursor and activator.

The loading of precursor on the support varies depending upon a number of factors, including the identities of the precursor and the support, the type of olefin polymerization process used, the reaction conditions, and other concerns. Usually, the amount of precursor used is within the range of about 0.01 to about 10 wt. % of transition metal based on the amount of supported catalyst. A more preferred range is from about 0.1 to about 4 wt. %.

The modifier is a hydrosilane or polysiloxyhydrosilane. Hydrosilanes are organic compounds having a Si—H group. Polysiloxyhydrosilanes have one or more Si—O—Si groups and a Si—H group. Preferably, the modifier has the general structure:

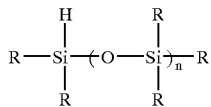

where each R is independently selected from the group consisting of H, $C_1$–$C_{30}$ hydrocarbyl, trialkylsiloxy and triarylsiloxy and n is an integer from 0 to 2000. Preferably, n is 0 or has a value of from 10 to 100. Suitable modifiers include alkyltrihydrosilanes, aryltrihydrosilanes, dialkyldihydrosilanes, diaryldihydrosilanes, trialkylhydrosilanes, triarylhydrosilanes, alkylhydrosiloxanes, arylhydrosiloxanes, and the like, and mixtures thereof. Preferred modifiers include polymethylhydrosiloxanes, t-butyldimethylhydrosilane, diethyidihydrosilane, and triisopropylhydrosilane. Surprisingly, low levels of modifier result in large improvements in activity. The modifier is added at a level up to 8,000 ppm Si. Preferably, the modifier is added at a level of from 20 to 5,000 ppm Si and more preferably at a level of from 50 to 3,000 ppm Si. We calculate ppm Si by dividing the weight of the Si in the modifier by the weight of resultant polyolefin. Higher silane levels do not give further increases in activity and can cause undesirably low polymer molecular weights. Surprisingly, these low levels of modifier, when used in combination with a catalyst precursor containing an anionic boraaryl ligand, give large activity boosts (see Table 1, below). The catalyst precursor can be expensive so an improvement in activity reduces costs. Also reduced by the activity boost is the residual transition metal in the polyolefin.

The modifiers can be used in a variety of well-known olefin-polymerization processes, including gas, high pressure liquid, slurry, solution, or suspension-phase techniques and combinations of these. The pressures used typically range from about 15 psig to about 15,000 psig. Polymerization temperatures range from about –100° C. to about 300° C., more preferably from about 20° C. to about 200° C., and most preferably from about 60° C. to about 150° C.

The following examples merely illustrate the invention. Those skilled in the art will recognize many variations that are within the spirit of the invention and scope of the claims.

EXAMPLE 1

Copolymerization with Modifier

A polymerization reactor was purged with dry nitrogen at 100° C. After cooling the reactor to ambient conditions, 0.6 mL of a 0.92 M solution of triisobutylaluminum in heptane, 0.5 mL of a 0.5 M solution of polymethylhydrosiloxane in heptane (available from Aldrich Chemical Company; approximate molecular weight=2266 amu; approximate number of repeat units, n, =35; density=1.006 g/mL), 50 mL of 1-butene and 800 mL of isobutane were charged to the reactor. The reactor was heated to 75° C. Ethylene was added to the reactor to a pressure of 400 psig followed by a mixture of 0.021 gram supported catalyst and 0.2 mL of a 0.92 M solution of triisobutylaluminum in heptane.

The supported catalyst was previously prepared by charging a flask with 1.12 g of small particle size polyethylene powder (MICROTHENE FN 510 polyolefin powder; melt index 5; density 0.923; median particle size 20 microns, available from Equistar Chemicals), 0.032 g of cyclopentadienyl (1-methylboratabenzene)zirconium dichloride (0.10 mmol), 0.122 g of trityl tetrakis(pentafluorophenyl)borate (0.13 mmol) and 10 mL of toluene. The mixture was stirred for 1 hour and the resultant slurry dried under vacuum to remove the solvent and recover the supported catalyst.

The polymerization reactor pressure was maintained at 400 psig by addition of ethylene and the temperature was maintained at 75° C. Polymerization continued for 1 hour after which time the reactor was vented and the polymer removed. From the weight of the polymer, the activity was calculated to be 9,300 g polymer per gram of supported catalyst (total weight of the catalyst including the weight of the support) per hour. The number average ($M_n$) molecular weight of the polymer was measured by gel permeation chromatography (GPC) using 1,3,5-trichlorobenzene at 145° C. to be 6,300. The melt index (MI) was measured according to ASTM D-1238, Condition E to be 52 dg/min. From the weight of the polymer, the amount of modifier used was calculated to be 2100 ppm Si.

COMPARATIVE EXAMPLE 2

Copolymerization without Modifier

The copolymerization process of Example 1 was generally followed except that no polymethylhydrosiloxane was used. The activity was calculated to be 5,000 g polymer per gram supported catalyst per hour. The polymer had Mn of 10,400 and Ml of 40 dg/min. A duplicate copolymerization was run giving an activity of 5,100 g polymer per gram supported catalyst per hour, an Mn of 9,300 and Ml of 30 dg/min. The average of the two runs was an activity of 5,050 g polymer per gram supported catalyst per hour, an Mn of 9,850 and Ml of 35 dg/min. The average values are reported in Table 1.

This comparative example shows that without the modifier as used in the process of the invention, the catalyst activity is greatly reduced.

EXAMPLES 3–9

Copolymerizations with Modifier

The copolymerization process of Example 1 was generally followed except that the modifier was varied. The results are listed in Table 1. Example 3 was run in duplicate giving an activity of 6800 g polymer per gram supported catalyst per hour, an Mn of 9,800 and Ml of 26 dg/min for one run and an activity of 8,200 g polymer per gram supported catalyst per hour, an Mn of 8,400 and Ml of 64 dg/min for the second run. The average of the two runs was an activity of 7,500 g polymer per gram supported catalyst per hour, an Mn of 9,100 and Ml of 45 dg/min. The results for Comparative Examples 4 and 5 and Examples 6–9 are for single runs.

TABLE 1

Copolymerization Results

| Ex. No. | Modifier (all 0.5M in heptane) | Amount (mL) | Amount ppm Si | Activity | Ml | $M_n$ |
|---|---|---|---|---|---|---|
| 1 | polymethylhydrosiloxane | 0.5 | 2100 | 9300 | 52 | 6300 |
| C2 | none | — | 0 | 5050 | 35 | 9850 |
| 3 | polymethylhydrosiloxane | 0.8 | 3900 | 7500 | 45 | 9100 |
| C4 | polymethylhydrosiloxane | 1.6 | 9900 | 4200 | 25 | |
| C5 | polymethylhydrosiloxane | 3.0 | 17,000 | 3600 | 34 | 9000 |
| 6 | t-butyldimethylhydrosilane | 0.4 | 62 | 5200 | 50 | 10,900 |
| 7 | diethyldihydrosilane | 0.5 | 58 | 7300 | 82 | |
| 8 | diethyldihydrosilane | 1.0 | 118 | 9200 | 86 | |
| 9 | triisopropylhydrosilane | 0.5 | 77 | 7300 | | |

Example 3 shows that no additional activity boost is obtained by increasing the level of the modifier. Comparative Examples 4 and 5 show that at high levels of modifier, the catalyst activity is diminished compared to the control (C2). Examples 6–9 show that other hydrosilanes are also effective in increasing the activity of the catalyst.

The preceding examples are meant only as illustrations. The following claims define the invention.

We claim:

1. A process which comprises polymerizing an olefin with a catalyst precursor in the presence of an activator and a modifier, wherein the catalyst precursor comprises a Group 3 to 10 transition metal, M, and at least one anionic boraaryl ligand and wherein the modifier is selected from the group consisting of hydrosilanes and polysiloxyhydrosilanes and is used at a level of up to 8,000 ppm Si based upon the amount of polyolefin produced.

2. The process of claim 1 wherein the olefin is selected from the group consisting of ethylene, propylene, 1-butene, 1-pentene, 1-hexene, 1-octene, and mixtures thereof.

3. The process of claim 1 wherein the catalyst precursor comprises a Group 4 transition metal.

4. The process of claim 3 wherein the catalyst precursor comprises zirconium.

5. The process of claim 1 wherein the activator is selected from the group consisting of alumoxanes, alkylaluminum compounds, organoboranes, ionic borates, ionic aluminates, aluminoboronates and mixtures thereof.

6. The process of claim 1 wherein the modifier has the general structure:

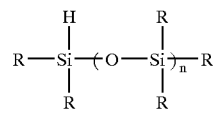

where each R is independently selected from the group consisting of H, $C_1$–$C_{30}$ hydrocarbyl, trialkylsiloxy and triarylsiloxy and n is an integer from 0 to 2000.

7. The process of claim 6 wherein n is an integer from 10 to 100.

8. The process of claim 6 wherein n is 0.

9. The process of claim 1 wherein the catalyst precursor is supported.

10. The process of claim 1 wherein a portion of the activator is premixed with the catalyst precursor.

11. The process of claim 1 wherein the polymerization is performed at a temperature within the range of about 60° C. to about 150° C.

12. The process of claim 1 wherein the modifier is used at a level of from to 5,000 ppm Si based upon the amount of polyolefin produced.

13. The process of claim 12 wherein the modifier is used at a level of from 50 to 3,000 ppm Si based upon the amount of polyolefin produced.

14. The process of claim 4 wherein the catalyst precursor is cyclopentadienyl(1-methylboratabenzene)zirconium dichloride.

15. The process of claim 14 wherein the activator is a combination of an ionic borate and an alkyl aluminum compound.

16. The process of claim 15 wherein the activator is a combination of trityl tetrakis(pentafluorophenyl)borate and triisobutylaluminum.

* * * * *